(12) United States Patent
Hauser (10) Patent No.: US 8,539,603 B2
(45) Date of Patent: Sep. 17, 2013

(54) SYSTEM AND METHOD FOR SECURE COMMUNICATION

(75) Inventor: Ralph Hauser, Zollikon (CH)

(73) Assignee: Privashere AG, Zurich (CH)

( * ) Notice: Subject to any disclaimer, the term of this patent is extended or adjusted under 35 U.S.C. 154(b) by 867 days.

(21) Appl. No.: 10/558,640

(22) PCT Filed: Jun. 1, 2004

(86) PCT No.: PCT/CH2004/000329
§ 371 (c)(1), (2), (4) Date: Nov. 30, 2005

(87) PCT Pub. No.: WO2004/107687
PCT Pub. Date: Dec. 9, 2004

(65) Prior Publication Data
US 2006/0230461 A1    Oct. 12, 2006

Related U.S. Application Data

(63) Continuation-in-part of application No. PCT/CH03/00341, filed on May 30, 2003.

(51) Int. Cl.
*H04L 9/32* (2006.01)
(52) U.S. Cl.
USPC .............. 726/27; 713/168; 713/169; 713/170
(58) Field of Classification Search
USPC .................. 709/206–208, 227–229; 713/155, 713/168–194; 380/252–255, 277–279; 726/27–30
See application file for complete search history.

(56) References Cited

U.S. PATENT DOCUMENTS

| | | | |
|---|---|---|---|
| 5,448,641 A * | 9/1995 | Pintsov et al. | 380/51 |
| 5,784,565 A * | 7/1998 | Lewine | 709/229 |
| 5,960,080 A * | 9/1999 | Fahlman et al. | 380/252 |
| 6,023,700 A * | 2/2000 | Owens et al. | 707/10 |
| 6,243,763 B1 * | 6/2001 | Brodsky et al. | 719/316 |
| 6,301,658 B1 * | 10/2001 | Koehler | 713/155 |
| 6,618,747 B1 * | 9/2003 | Flynn et al. | 709/206 |
| 6,978,366 B1 * | 12/2005 | Ignatchenko et al. | 713/166 |
| 7,296,154 B2 * | 11/2007 | Evans et al. | 713/169 |
| 7,302,413 B1 * | 11/2007 | Bent et al. | 705/38 |
| 7,454,376 B1 * | 11/2008 | Argenbright | 705/36 R |
| 7,647,498 B2 * | 1/2010 | Brown et al. | 713/168 |

(Continued)

FOREIGN PATENT DOCUMENTS
WO   WO 01/97089 A   12/2001

*Primary Examiner* — Kambiz Zand
*Assistant Examiner* — Phy Anh Vu
(74) *Attorney, Agent, or Firm* — Agris & von Natzmer LLP.; Joyce von Natzmer (57) ABSTRACT

A system for secure communication comprises a secure electronic messaging server which is accessible by the public and a database for storing data of messaging users. The data comprises the tracking of trust establishing out-of-band verification and the monitoring of the trust relations derived thereof, messaging user-based instructions related to the handling of incoming mails, wherein the instructions comprise information related to an at least one security level chosen by the messaging user. The system comprises message handlers to automatically handle in- and outgoing mails according to these instructions. This system allows transmitting messages privately and securely with minimum prerequisites for its users. The inventive system allows a secure transmitting of messages between a sender and a recipient, wherein only one of the two parties is a messaging user.

10 Claims, 5 Drawing Sheets

(56) References Cited

U.S. PATENT DOCUMENTS

| | | | |
|---|---|---|---|
| 2002/0032665 A1* | 3/2002 | Creighton et al. | 705/76 |
| 2002/0042876 A1 | 4/2002 | Smith | |
| 2002/0051221 A1* | 5/2002 | Wakabayashi | 358/402 |
| 2002/0059385 A1* | 5/2002 | Lin | 709/206 |
| 2002/0144154 A1* | 10/2002 | Tomkow | 713/201 |
| 2002/0147780 A1* | 10/2002 | Liu et al. | 709/206 |
| 2003/0135574 A1* | 7/2003 | Burg | 709/207 |
| 2003/0147536 A1* | 8/2003 | Andivahis et al. | 380/277 |
| 2003/0163739 A1* | 8/2003 | Armington et al. | 713/202 |
| 2003/0200267 A1* | 10/2003 | Garrigues | 709/206 |
| 2003/0225692 A1* | 12/2003 | Bosch et al. | 705/42 |
| 2005/0114447 A1* | 5/2005 | Cameron et al. | 709/204 |
| 2006/0015545 A1* | 1/2006 | Ezra | 707/204 |

\* cited by examiner

SYSTEM AND METHOD FOR SECURE COMMUNICATION

This is the U.S. national stage of International application PCT/CH2004/00329, filed Jun. 1, 2004 as a continuation-in-part application of international application PCT/CH2003/00341, filed May 30, 2003.

FIELD OF THE INVENTION

The invention relates to a system, a computer program product and a method for secure communication.

BACKGROUND OF THE INVENTION

Asymmetric encryption for end-to-end e-mail encryption is well known in the prior art. Pretty Good Privacy also known as Phil's good program, called PGP, by PGP Corporation, Palo Alto Calif., and its open source follow-up effort GnuPG are one example. Similarly, the OSI standards family has come forth with x509 or S/MIME.

In these technologies, there are many approaches for establishing a trust or security hierarchy with all its ramifications. The pure "web-of-trust" approach is pioneered by GPG/PGP.

The S/MIME family of standards puts significant effort in managing keys and trust by a cascade of central institutions, such as Certification Authorities (CAs) and Registration Authorities (RAs), and in revocation, which are all summarized under the term "public key infrastructure" (PKI).

To date, except for very specific business relationships or inside large corporations, PKIs have not met broad user and consumer acceptance. This is due to several reasons:

Difficulties with liabilities and governance of CAs; Government institutions are reluctant to certify for data protection and privacy concerns and liability reasons as well;

Long and cumbersome processes are needed for obtaining a key and the human factor has not sufficiently been considered such as convenience during usage of such systems etc.

One approach to exchange messages that only relied on certificates for HTTPS web access is the now defunct "UPS Secure Online Courier" from United Parcel Service Inc. Similar services have been offered by various other companies such as Tumbleweed, Zixit, and CertifiedMail (see patent references below). While correct in their intent, these solutions had several points which could be improved, typically:

non-messaging users cannot respond;
downloads and installation of software are required;
some solutions also resort to self-decrypting archives that are a serious problem for anti-virus filters and off-line key guessing attacks;
initial passwords are sent in e-mails upon registration;
no out-of-band channel is supported for alternate sender/recipient verification;
management of private keys is often delegated to a central service (e.g. crypto-proxy or boundary/gateway server)—thus violating the rule that private keys are never shared;
costly special purpose servers must be run centrally by the mail domain providing institution;
lack of integration with the above state-of-the art end-to-end message security standards (due to proprietary approaches);
possession of private keys by end users is a precondition for the system to work at all;
it is necessary to obtain yet another e-mail address and traffic analysis is not prevented, so that an attacker can passively collect complete header information on each sent message.

In US 2002/0007453 ("Secure Electronic Mail System and Method") solutions to the above-mentioned problems are proposed; however, many of the above-stated requirements are not addressed because according to US 2002/0007453 the sender is required to have a private key and sender-side special purpose software.

According to U.S. Pat. No. 6,424,718 ("Data communications system using public key cryptography in a web environment") multiple private keys are stored on a server whereas the private keys are shared among users. U.S. Pat. No. 6,424,718 also requires the download of applet code to the client from the server.

According to US 2003/0007645 ("Method and system for allowing a sender to send an encrypted message to a recipient from any data terminal") a tunnel is built to a server hosting recipient public keys and the sender's private key. However, the latter appears to be a significant disadvantage because private keys are not to be entrusted to anybody.

WO 01/97089 A1 ("Secure Forwarding System", by Zixit) describes fundamental mechanisms for secure email delivery, however, beyond the very basic scenario it fails to address the issues of out-of-band authentication and the trust relations derivable there from.

U.S. Pat. No. 6,529,956 ("Private, trackable URLs for directed document delivery") and U.S. Pat. No. 6,516,411 ("Method and apparatus for effecting secure document format conversion") assigned to Tumbleweed address the basic mechanisms of one-time URLs for secure message delivery and recipient-determined format presentation beyond transmission security. No provisions are taken to address the implications of for example a forgotten password or other lost authenticator of an involved party.

U.S. Pat. No. 6,684,248 ("Method of transferring data from a sender to a recipient during which a unique account for the recipient is automatically created if the account does not previously exist", certifiedmail.com) presents a mechanism to securely deliver a message from a messaging user to a communication partner that is not yet a messaging user. By granting access on a "per account" basis instead of "per sender" basis, it fails to appropriately address the needs different senders and may lead to inadvertent information leaking e.g. due to typos in a submitted e-mail address.

SUMMARY OF THE INVENTION

It is therefore an object of the invention to provide a system and a method for performing a secure and private electronic message exchange eliminating at least some of the above-mentioned shortcomings.

According to the present invention, these objects are achieved particularly through the features of the independent claims. In addition, further advantageous embodiments follow from the dependent claims and the description.

A computer-based system for secure communication of electronic messages comprises a secure messaging server. The secure messaging server is accessible to messaging users via a telecommunication network and is designed to store incoming messages received from the messaging users. The secure messaging server also comprises a database for storing data of the messaging users and means to automatically handle in- and outgoing messages according to the data of the messaging users stored in the database.

According to the present invention, the above-mentioned objects are particularly achieved in that the computer-based system for secure communication of electronic messages comprises a trust management module for managing for the messaging users out-of-band verification of their communication partners. The trust management module forms in the database associations between the messaging users and their communication partners, each association being indicative of a trust establishing out-of-band verification of one communication partner of one of the messaging users. Thus, the trust management module supports web-mail and Mail User Agent ("MUA"—a mail program such as Outlook or Eudora) users to manage the out-of-band verification of their counterparts. Moreover, the system comprises access control means for controlling access to a stored message based on the association between one of the messaging users specified as a sender of the message and one of the communication partners specified as a recipient of the message. Controlling access to stored messages based on qualified associations between messaging users and their communication partners makes it possible to prevent messages being delivered unintentionally to a recipient whose address was specified erroneously by the sender. Furthermore, it is possible to prevent access to a message by an unauthorized user who "hijacked" the recipient's mail account, for example by changing the account's access password and intercepting any communications related thereto. For that purpose, preferably, the trust management module is designed to detect a defined trust-destroying action performed by a communication partner and to store in the database information indicative of a reduced trust level for the communication partner performing the defined trust-destroying action. In addition, the automatic and ongoing management of the trust indicating associations by the system makes it possible to exchange securely messages between messaging users without the need for password protection of every instance of message exchange. Because an out-of-band counterpart verification is not needed upon each exchange, but only when a trust-lowering event such as an authenticator-reset (e.g. a "forgot password event") occurred with either party, the efficiency of the communication is increased by the trust management module. Efficiency and ease of use is improved while security is maintained. The system is designed in a way that messaging users can define their preferred trust management using multiple security levels.

In a preferred embodiment, the trust management module is designed to generate a message unlock code and to transmit securely the message unlock code to the sender. The access control means are designed to control access to the message based on a comparison of the message unlock code transmitted to the sender and a message unlock code received from the recipient. The trust management module is designed to form automatically in the database between the sender and the recipient an association indicative of a trust establishing out-of-band verification of the sender and the recipient dependent on the comparison. In other words, based on a system generated code or password which is communicated out-of-band, i.e. outside the system and outside the communication network, for example by means of a letter or a phone call, an initial trust indicating association is established automatically by the system between the sender and the recipient of the message.

In an embodiment, the trust management module is designed to form in the database group associations for groups of more than two of the messaging users, a group association being indicative of a trust establishing out-of-band verification of the group of messaging users. The access control means are designed to control access to a message based on the group association between messaging users specified as recipients of the message. In this way, groups of messaging users mutually trusting each other can be efficiently joined in one group.

In an embodiment, the trust management module is designed to store in the database a time stamp for every association with a communication partner and to store in the database information indicative of a reduced trust level for a communication partner included in an association having a time stamp older than a defined reset period or a defined point in time. In this way, it is possible to limit the validity of trust indicating associations for a defined time period or up to a certain point in time. On one hand this eliminates outdated trust indicating associations; on the other hand, it is possible to set up intentionally time-limited associations.

In a preferred embodiment, the access control means are designed to block for communication partners having a reduced trust level access to any message stored in the system. In this way it is ensured that an unprivileged message user does not get unauthorized access to messages or other information stored on the system in the past.

In an embodiment, the access control means are designed to provide to a recipient access to a stored message through a link to the stored message, the link being protected by a message unlock code to be supplied by a recipient not included in an association indicating a trust establishing out-of-band verification. Sending messages by means of code or password protected links makes it possible to forward securely messages to recipients who are not included in a respective association or who are not registered in the system.

In an embodiment, the system comprises a mass-mail module designed to upload to the system from a messaging user a message to be forwarded as mass-mail and to provide to the massaging user a list of message unlock codes for each recipient not included in an association indicating a trust establishing out-of-band verification. The mass-mail module makes it possible to distribute securely mass mailings to recipients who are not included in a respective association or who are not registered in the system.

Preferably, the messaging server is accessible to the public and for messaging users who are subscribers to the system the database includes subscriber-based instructions, the instructions comprising information related to one of more than one possible security levels chosen by a subscriber. The system comprises means to automatically handle in- and outgoing messages according to the subscriber-based instructions and the system comprises means for automatically encrypting messages according to the security level chosen by the recipient or the sender of a message, a recipient's public key being used for encrypting the messages. These features make it possible for subscribers of the system to configure individually and flexibly the security procedures and levels to be followed and executed automatically by the system.

In a further embodiment, the system comprises multiple servers and the data of the messaging users stored in the database includes jurisdiction data specifying where messages received from the messaging users are to be stored and from where notifications about messages received from the messaging users are to be sent. In a further variant, it is also possible to specify where up- and downloads are to be directed to. The system comprises a service level dimensions module comprising data concerning network-geographic positioning of the multiple servers. The service level dimensions module enables messages received from the messaging users to be stored in a server as specified in the jurisdiction data and notifications about messages received from the messaging users to be sent from a server as specified in the jurisdiction data. These features make it possible for message users to configure individually and flexibly where the system is to store messages submitted and/or received by the respective message user and from where notifications about incoming messages are to be sent to the respective user. In other words, the messaging users may chose under which jurisdiction they want their messages stored and from which jurisdiction they want to obtain notifications if at all. This allows federated operation of multiple private messaging server domains. The user is able to specify the server's service level. The multiple instances of the service are run according to different scenarios that determine the security of information flows as well as end-user convenience:

- in the "Island" scenario, there is no connection to the outside world. Each instance of the service maintains its own, closed customer base.
- in the "Complete Black Hole" scenario, the sender has to know that the recipient is messaging user to a black-hole instance of the service. In this case, the message can be delivered to there. Otherwise, the message remains at the sender's submission service server and the recipient is treated as a non-messaging user. The basic principle behind this scenario is that there is no information outflow from the black hole.
- in the "Content Black Hole" scenario, the "no information outflow" principle is maintained for message content i.e. body, attachments, and subject, but this instance of the service exchanges information about its messaging user base with its peers and possibly also reports the message status back to the sender service.
- the "True Federation" scenario requires the addition of a directory service. Especially if run by the same provider, this directory service will also contain some indication of network-geographic positioning in order to minimize the network load and distance when moving and storing large attachments.

The present invention also relates to a computer-implemented method for secure communication of electronic messages. Moreover, the present invention relates to a computer program product comprising computer program code means for controlling one or more processors of a system for secure communication of electronic messages such that the system performs the functions as described above.

BRIEF DESCRIPTION OF THE DRAWINGS

The present invention will be more readily understood upon reading the following detailed description in conjunction with the drawings in which.

DESCRIPTION OF PREFERRED EMBODIMENTS

Figure 4:
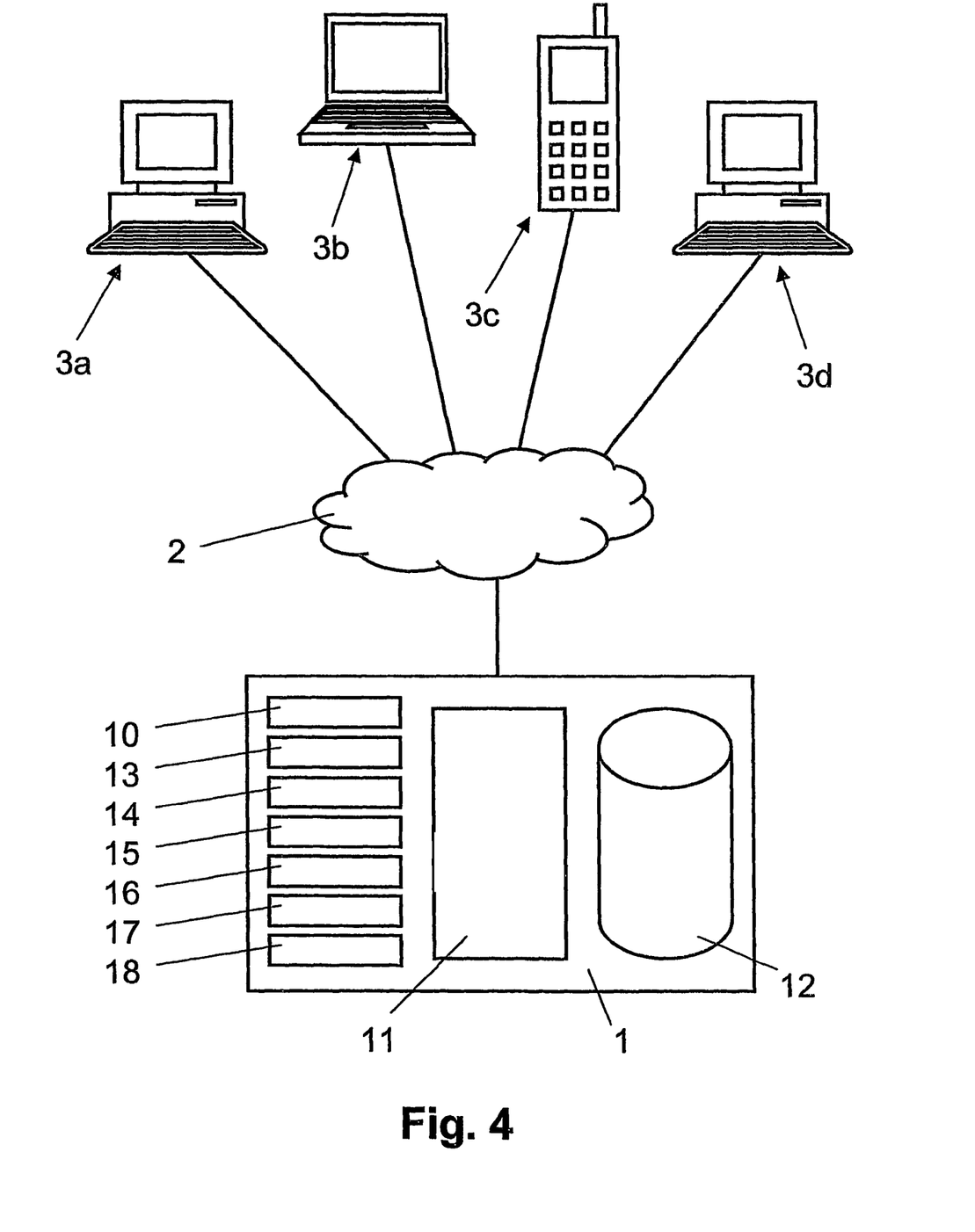
FIG. 4 shows a block diagram illustrating schematically a system for secure communication of electronic messages, the system being connected via a telecommunication network to communication terminals of messaging users.

In FIG. 4, the reference numerals 3a, 3b, 3c, 3d refer to communication terminals connected via a telecommunication network 2 to a computer-based system 1 for secure communication of electronic messages.

The telecommunication network 2 includes the Internet and, for example, fixed networks and wireless networks for accessing the Internet. For example, the telecommunication network 2 includes a local area network (LAN), an integrated services digital network (ISDN), a global system for mobile communication (GSM), a universal mobile telephone system (UMTS) or another mobile radio telephone system, and/or a wireless local area network (WLAN).

The computer-based system 1 comprises one or more computers. As is illustrated schematically in FIG. 4, the computer-based system 1 includes at least one secure messaging server 11 accessible by the public, a database 12 for storing data of its messaging users, and various functional modules namely an access control module 10, a trust management module 13, a mass mail module 14, a service level dimensions module 15, a "secure contact me" module 16, a secure mail submission server module 17, and a secure mail receiving module 18. These functional modules are implemented preferably as computer program products stored in memory of the computer-based system 1 or on a data carrier insertable in and connectable to the computer-based system 1. The messaging server 11, the database 12, and the functional modules of the computer-based system 1 can be installed on one common or on separate computers. For example, the messaging server 11 is implemented on a separate computer (hardware server) and the database 12 is implemented on a separate computer as a database server. Preferably, the database 12 includes a database management system.

The communication terminals 3a, 3b, 3c, 3d are for example personal computers (PC), e.g. desktop, laptop, or notebook models, digital assistants (PDA), or mobile radio phones. The communication terminals 3a, 3b, 3c, 3d include e-mail access software, e.g. Microsoft Outlook, and/or browser software, e.g. Microsoft Internet Explorer, for accessing the messaging server 11.

Preferably, the computer-based system 1 departs from a messaging server 11 providing a protected Web-Mail service, preferably a SSL (Secure Socket Layer) protected Web-Mail service. Although the preferred embodiment of the computer-based system 1 is described based on the use of such a SSL protected Web-Mail service, the scope of protection shall not be limited to this kind of service, since other services are or will be known in the art and may be useable too. The functionality and the steps performed by the functional modules will be described later.

In the database 12, trust indicating associations between messaging users and their communication partners are stored. The associations are formed as pairs of communication partners entered in a table of the database 12. The associations can also be formed through entries of communication partners into lists assigned to a particular messaging user. The associations indicate at least which communication partners exchanged messages and include information about the level of out-of-band verification, the novelty and validity of the association, specific rules given by the messaging user, the rules being related to the delivery of (mail) messages sent to the messaging user. The rules comprise at least an instruction what to do with specific messages received by the system and which security level should be observed when handling these messages. The database 12 can furthermore comprise instructions related to messages sent by the messaging user.

The functional modules described in the following paragraphs are preferably all included in the computer-based system 1; however, it is also possible to use individual modules as stand alone solutions. In the following paragraphs, the proposed computer-based system 1 for secure communication of electronic messages is also referred to as "PrivaSphere".

Trust Management Module

The trust management module 13 enables the users of the system (i.e. the sender or recipient) in a novel way to minimize the need for out-of-band verification of their counterparts (i.e. the recipient or the sender), wherein trust management is established in a user-centered way. If sender and recipient are messaging users of PrivaSphere, PrivaSphere acts as a "hub" server being trusted by both parties as the intermediary. This intermediary controls the access to the content of the message and has established an authentication method with each messaging user allowing it to support transitive trust relationships. Under the assumption that either party takes due care of its authenticator—typically a shared secret (e.g. password), something they have (e.g. a hardware device or a private key), or something "they are" (e.g. when using biometric means for authentication)—it is not necessary to ask from a sender out-of-band counterpart verification upon each communication typically, the messaging user can choose that verification is only mandated upon the first contact or after major events causing the previous authenticator no longer to be usable—i.e. the password is forgotten or revealed, the private key lost or revealed, the (biological) fingerprint unavailable due to a skin disease or accident/amputation.

If it is acceptable to the sender to only refresh trust themselves under such exceptional conditions, the cost of trustworthy communication can be greatly reduced with the following pieces of logic:

```
i) Build Sender Trust list upon each message submission:
for each recipient
   if recipient is a valid member of sender's trust-list
   then send message
   else
      prompt sender for out-of-band verification result
      if verification result = OK
      then
         send message
         if recipient is a messaging user and thus
           has a permanent password with the system
         then
           enter the pair (recipient, timestamp) into sender's trust list
         end if
      else
         save message for recipient in queue for later sending upon verifi-
            cation acknowledgement by the sender (e.g. in case of a
            mail-based, i.e. store-and-forward message submission)
            OR wipe it
         OR send a MUC protected link and label for
            delayed trust pair insertion (even if the recipient has a
            public key in his account) or is capable of receiving via
            secure POP.
      end if
   end if
end for each
if recipient enters correct MUC for a message labeled for delayed trust
insertion then
   if recipient is a messaging user and thus has a
      permanent password with the system or chooses one within the same
      session
   then
      enter the triple (sender, recipient, timestamp) into sender's and
         recipient's trust list
   end if
   grant access to the message
end if
ii) update every sender's trust-list upon each authenticator reset or other
trust lowering event:
for each trust-list
```

```
   if the lowered messaging user is a member
   then
      if recipient-addition-time-stamp < lowering event
         timestamp
      then remove lowered messaging user from
         trust-list
      end if
   end if
end for each
```

To prevent information leak to account hijackers who for example obtained account access by means of an intercepted password reset, all sensitive (WebMail) account content such as inbox, sent, and draft folders must be blocked when such a trust-destroying action has occurred. Among others, the options are:

delete all prior content all prior content will be (re-) protected with a MUC. Upon the entry of the first MUC for a message of a given sender, all messages by this sender will be unprotected. In one embodiment, the messaging user can declare it as acceptable prior to the authenticator reset that while originally, it was not possible to identify multiple messages as coming from the same sender in the WebMail Inbox, after a reset, the messages are visibly grouped by sender. As a further sub-embodiment, also all new messages from the same sender that have been sent between the authenticator reset and the re-requesting of a MUC could be unprotected at the same time, but this implies that the sender who is re-supplying the MUC is aware that possibly a different recipient inherited an e-mail address (e.g. one secretary quit and now it is a new one).

Essential for the correctness of this trust list management feature is the availability of reliable "last authenticator reset dates" per messaging user. When two messaging users are communicating for the first time and performing an out-of-band verification, the sender must be able to ask the recipient when the last authenticator reset was because the recipient might not be aware of the account being hijacked since the last access by the recipient.

Also, the trust list cannot only be used upon sending a message, but also to indicate to a recipient her or his relationship with the sender and the other recipients of a message. Especially, the recipient can be warned if a sender previously was out-of-band verified, but had an authenticator reset since.

Not every forgotten-password event has necessarily to be an authenticator reset. For example, there can be a combination of authenticators available to a server by the messaging user uploading a public key. In the forgotten password case, an encrypted challenge is sent to the messaging user and if it can be decrypted, this can avoid the above trust reset process. Essentially by uploading the public key, the messaging user has introduced a second authenticator beyond the initial password.

In the WebMail, but also in each message reaching the recipient in a regular or MIME mail (either encrypted or via secure POP), the recipient is always informed about his or her relative trust status in respect to the other recipients or the sender and the last authenticator reset date. The trust status levels comprise at least:

T1 mutual trust

T2 unidirectional trust (e.g. if another messaging user is reached without a MUC when no communication between the two has occurred before or the recipients' trust level was reduced since the last communication)

T3 messaging user that needs a MUC

T4 communication partner (also needs a MUC)

T5 unknown (from address not validated due to message submission via "secure contact me")

T6 closed (counterpart account not active—e.g. because password compromised, e-mail no longer active, etc.)

In the list above, T1 indicates the highest level of bi-directional trust whereas T2 indicates a trust level limited to one direction. The trust levels T3 to T6 indicate reduced trust levels, T5 and T6 indicating the lowest trust levels.

Figure 5:
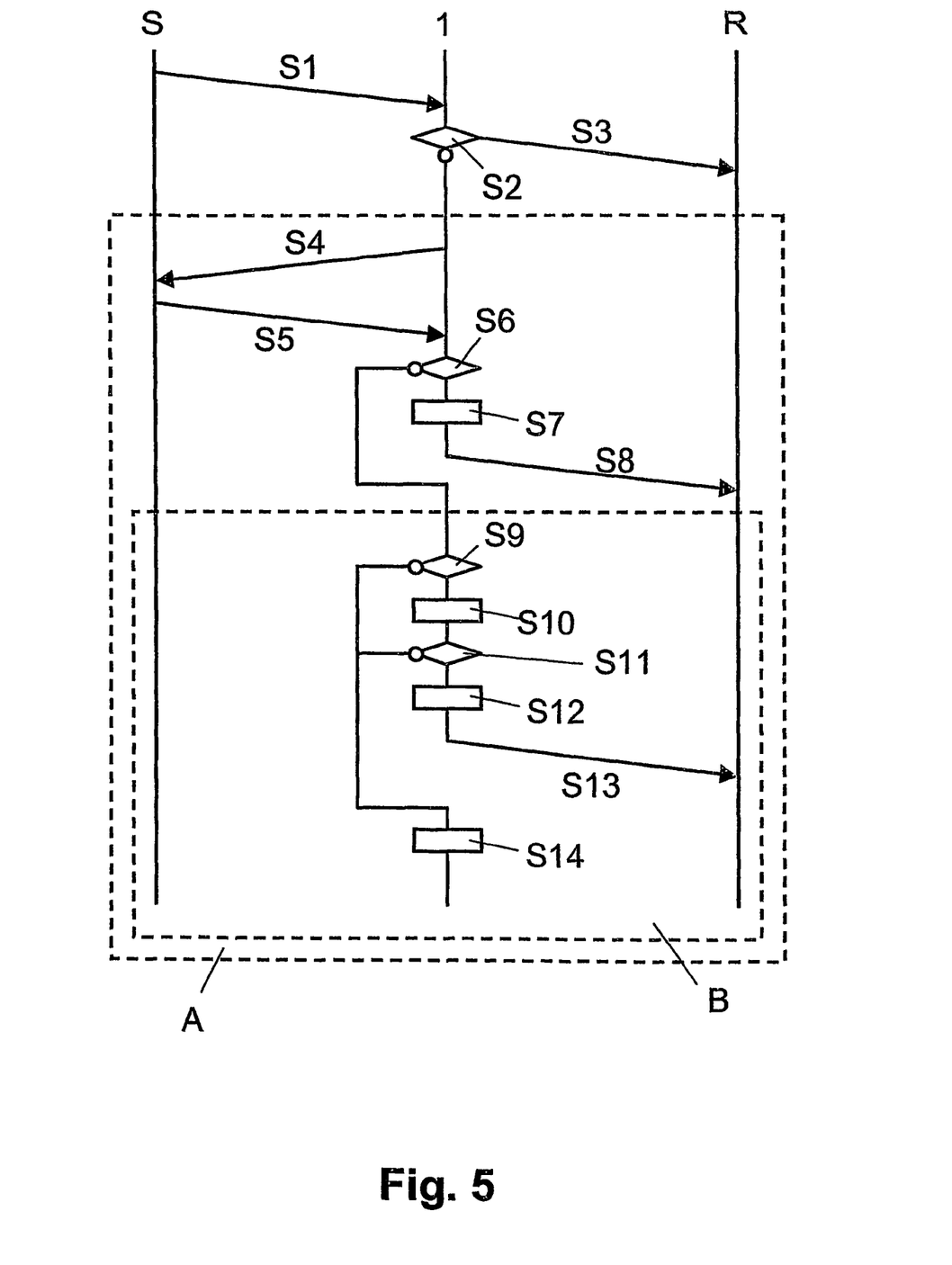
FIG. 5 shows a flow diagram illustrating an example of a sequence of steps executed in the system for secure communication of electronic messages.
Figure 6:
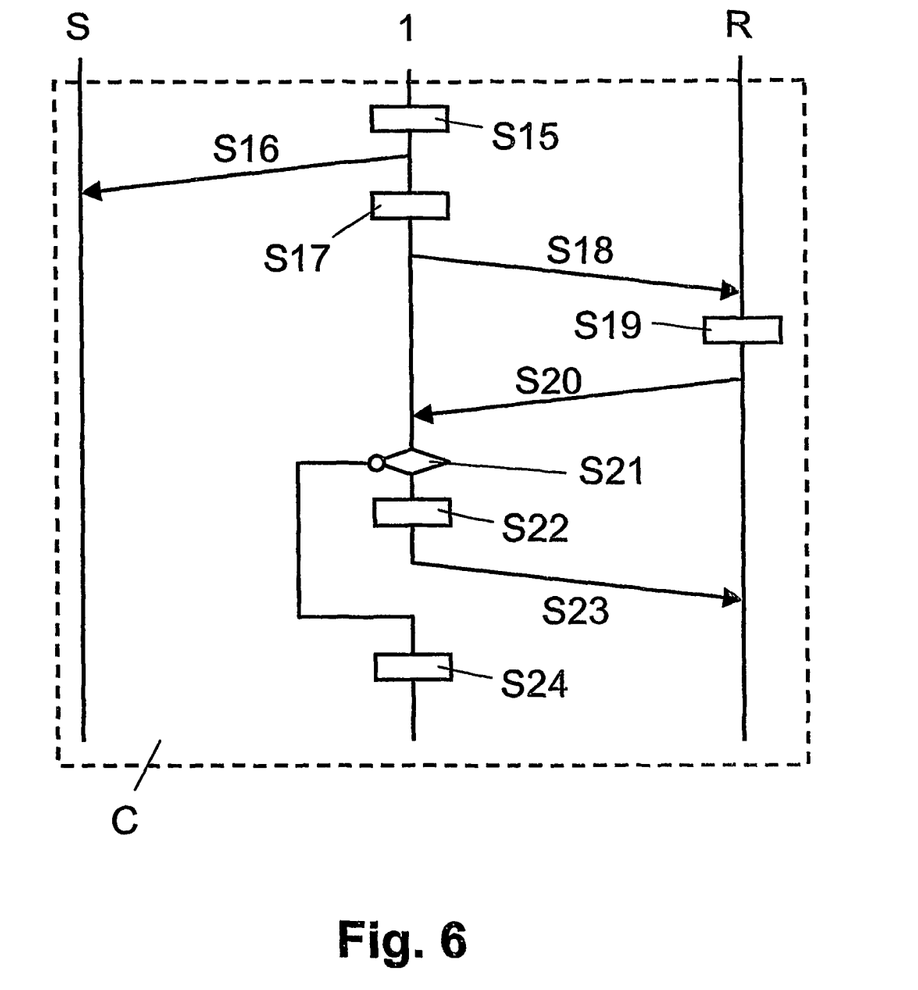
FIG. 6 shows a flow diagram illustrating an example of an alternative sequence of steps executed in the system for secure communication of electronic messages.

In the following paragraphs, examples of sequences of steps performed by the functional modules in the context of trust management will be explained with reference to FIGS. 5 and 6. In the examples of FIGS. 5 and 6, one of the communication terminals 3a, 3b, 3c, 3d is assumed to be the sender S of a message and another one of the communication terminals 3a, 3b, 3c, 3d is assumed to be the recipient R of the message.

As is illustrated in FIG. 5, in step S1, the message is submitted securely by the sender S to the computer-based system 1. The message is submitted in encrypted form as an e-mail or through a secure tunnel via an Internet form, for example.

In step S2, the trust management module 13 of system 1 checks whether or not the association between the sender S and the recipient R indicates a trust level not requiring further verification of the recipient R. If no further verification of the recipient is required, in step S3, the access control module 10 of system 1 grants to the recipient R access to the message and the message is forwarded securely to the recipient R. For example, the message is forwarded in encrypted form by e-mail or through a secure tunnel via an Internet page, for example through a HTML form. Otherwise, in step S4, the trust management module 13 of system 1 requests the sender S to enter and submit information concerning the out-of-band verification of the recipient R.

In step S5, the sender sends the requested verification information to the system 1.

In step S6, the trust management module 13 of system 1 checks whether or not positive verification information was received in step S5. If positive verification information was received and the recipient is a messaging user (having a password to the system), in step S7, the trust management module 13 records an association between the sender S and the recipient R indicating that the recipient R is a communication partner trusted by sender S. For example, the recipient R is entered as a trusted communication partner in a list assigned to the sender S; preferably, the entry includes a time stamp indicating the time of entry or an expiry time. Furthermore, in step S8, the access control module 10 of system 1 grants to the recipient R access to the message and the message is forwarded securely to the recipient R. However, if no positive verification information was received, the system 1 continues in step S9.

In step S9 the trust management module 13 checks whether or not the response time for returning the verification information has exceeded a defined maximum response time. If the response time has exceeded the maximum response time, no access to the message is granted to the recipient R and, if recipient R is the only recipient, the message is deleted by the system 1 in step S14. Otherwise, in step S10, the message is stored temporarily in the system 1 for a defined waiting period.

In step S11, the trust management module 13 checks whether or not positive verification information was received within the defined waiting period. If positive verification information was received and the recipient is a messaging user (having a password to the system), in step S12, the trust management module 13 records an association between the sender S and the recipient R indicating that the recipient R is a communication partner trusted by sender S. Furthermore, in step S13, the access control module 10 of system 1 grants to the recipient R access to the stored message and the stored message is forwarded securely to the recipient R. However, if no positive verification information was received within the defined waiting time, no access to the message is granted to the recipient R and, if recipient R is the only recipient, the message is deleted by the system 1 in step S14.

By means of user instructions stored in the database 12, different options for executing trust management and access control can be specified. In a first alternative option, block A including steps S4 to S14 is replaced by block C including steps S15 to S24. In a second alternative option, block B including steps S9 to S14 is replaced by block C including steps S15 to S24.

As is illustrated in FIG. 6, in step S15, the trust management module 13 generates a message unlock code (MUC). In step S16 the message unlock code is sent to the sender S by means of an internet page or in a secure service message.

In step S17, the access control module 10 generates an e-mail message with a link to the message received in step S1 whereby the link is protected by the MUC generated in step S15.

In step S18, the e-mail generated in step S17 is forwarded to the recipient R.

In step S19, upon selection of the link in the e-mail by the recipient R, the recipient R is requested to enter the MUC, which was passed by the sender S out-of-band to the recipient R. For example, the sender S transmits the MUC to the recipient R in a traditional paper letter or in an SMS, or the sender S reads it to the recipient via the phone in order to prevent eavesdroppers on the electronic "band" such as the Internet. Preferably, request and entry of the MUC are implemented by means of an Internet form.

In step S20, the MUC entered by the recipient R in step S19 is forwarded to the system 1.

In step S21, the access control module 10 checks whether or not the MUC received in step S20 from the recipient R corresponds to the MUC generated in step S15. If there is no correspondence, no access to the message is granted to the recipient R and, if recipient R is the only recipient, the message is deleted by the system 1 in step S24. It is possible to grant to the recipient R a limited number of attempts to enter the MUC. Otherwise, if there is correspondence between the generated and received MUC and if the recipient R is a messaging user (having a password to the system), in step S22, the trust management module 13 records an association between the sender S and the recipient R indicating bi-directional (mutual) trust between the sender S and the recipient R. For example, the sender S is entered in a trust list assigned to the recipient R and the recipient R is entered in a trust list assigned to the sender S, or the sender S and the recipient R are entered with a mutual trust level in a trust list. Moreover, in step S23, the access control module 10 grants to the recipient access to the stored message and the stored message is forwarded securely to the recipient R.

At this point it must be stated, that a subscribed sender can also sponsor message replies of non-subscribing recipients: For the matter of the message just received, such a recipient is sufficiently authenticated in a temporary way by providing the MUC. And therefore, the system will allow the recipient to also create a reply within such a session.

Group Trust is another set of features provided by the PrivaSphere Trust Management: Each user can become a group administrator. The administrator can invite arbitrary other system participants to join a trust group. Joining a trust group means for a group member that it will automatically also trust all members that are in the group so far. If the administrator adds a member, mutual trust is automatically established between the new member and all pre-existing members. A user can quit this group mechanism at any time. The trust relationships acquired during the group membership will remain intact when a member leaves because even though the leaving member may no longer like to have its trust network enhanced by a third-party administrator, its mutual relations to the other members need not alter due to this. In a further embodiment, quitting the group can also automatically remove the pertinent trust relations. In yet another embodiment, the origin of each trust relationship is documented in the user's trust management interface such that it is easy to manually manage the relationships upon membership status change.

In a further embodiment, group membership can be made mandatory for certain constituencies such as for example being a member of the same corporation e.g. represented by the same mail domain name.

In yet another embodiment, a group can be combined with a central archival function. Each message sent and/or received by any group member will also be recorded in a group archive. When an administrator adds an archive to a group, the membership of all voluntary group members is temporarily suspended until they accept this archive feature as well since this has a significant impact on their privacy. Groups can furthermore assume commercial functions such as for example all cost incurred by a group/all its members is charged to one central account.

Mass-Mail Module

The sender is a messaging user to PrivaSphere and wants to send secure mass-mails, be they individualized (e.g. form letters) or not. The sender can for example be a bank, which wants to send confidential messages, such as monthly statements of the individual accounts, to its clients.

The sender can upload the message to PrivaSphere for example with a single file containing the addressing information for all recipients. In return, the mass mail module 14 provides the sender with a list with a MUC and trust status for each recipient. If the recipient is a messaging user and is trusted by the sender, the MUC will be empty.

"Secure Contact Me" Module

The "secure contact me" module 16 allows messaging users to be reachable for non-subscribers through the invention's secure messaging service by virtue of a simple, unique URL at the PrivaSphere server. Because sender authentication is missing in this embodiment, the sender trust status representation to the receiving messaging user will be "unknown" for such a message. This may be in contrast to other messages by the same sender to the receiving messaging user where the sender used to regular, authenticated means to submit a message.

It is possible to configure "From" authentication requirements for the secure contact me sender in a flexible way. For example can a provided e-mail address be verified with a challenge until a contact-me-message is accepted, it can be just required to present, but unverified, or it can even be left optional altogether, thus allowing anonymous message submission. This may lead to additional trust status levels beyond the ones described so far.

More features of this are explained in section "private business card contact me module" of the patent application PCT/CH03/00341 filed in the name of the applicant, of which patent application priority is claimed.

Secure Mail Submission Server Module

As described in the above-mentioned patent application PCT/CH03/00341, messages can also be submitted by a messaging server 11 which is provided with the Secure Mail Submission Server module 17 to form a secure and trust-management enhanced SMTP server that doesn't deliver messages to recipient mail hosts, but inserts them into the PrivaSphere messaging service database. When doing so, if any of the recipients needs a MUC, these MUCs are transmitted via a secure Service Message back to the sender. Alternatively, by prefixing the recipient address with an unambiguous command (e.g. "psph_no_muc_"), the MUC can be suppressed as well.

Secure Mail Receiving Module

The Secure Mail Receiving Module 18 module makes it possible to receive messages with the messaging user's email/password pair from the PrivaSphere System. In contrast, Mail Receiving Servers as per prior art only cater to recipients belonging to the same domain as the server. All retrievals are confidentiality protected (e.g. TLS or SSL) and use standard protocols available in the predominant MUAs (e.g. Outlook's POP3 or IMAP). The trust status of each communication partner with respect to the recipient is provided inside the message. The messaging user can furthermore specify whether each message shall be time stamped and signed before delivery.

Throw-Away Reply-To

In order to ensure relational privacy protection against traffic analysis, the system 1 can be provided with additional program functionality so that each message sent by PrivaSphere via the SMTP protocol will obtain a cryptographically strong random Reply-To address (e.g. rrr23457safqw5fet4m@privasphere.com). This serves two purposes: In case of a non-delivery, the sender can be notified by means of this address. In case of an encrypted message, this can be used to reply to the sender within the MUA using the PrivaSphere Secure Mail Submission Server as SMTP server. Because header information such as the "ReplyTo" field typically is not encrypted, such an alias will only be used for one message and then retired in order not to reveal the counterpart in case of being subject to traffic analysis.

This Throw-away Reply-To furthermore allows that non-subscribing recipients can reply on the sender's cost in a store-and-forward way. In order for this to maintain security, the non-messaging user also must add the PrivaSphere mail server as additional, private "mail account" in their MUA and to connect to it in a secure manner (such as SSL). In today's MUAs this means to add at least another SMTP server. An alternative is that the replier uses a PrivaSphere public key and the corresponding, specific PrivaSphere mail address in encrypted form as described in the section "PrivaSphere public key module" of the above-mentioned patent application PCT/CH03/00341.

Service Level Dimensions Module

The Service level dimensions module 15 handles the presence of a multitude of servers. The messaging user can choose between at least the following key service level dimensions:
- jurisdiction where the content is stored; ("storage jurisdiction")
- jurisdiction from which notifications are sent and from—and to which up-and-downloads occur; ("contact jurisdiction")
- institutions running the service. E.g. a bank might offer more secure technologies both on the server side (for example the number of fire-walled hosting architecture segments, atomic shelters inside mountains, etc.), as well as on the client side (e.g. equipping their customers with security tokens, etc.)

When operating with a multitude of servers, these servers are connected with a virtual private network. Each server will contain the following extra sub module:
- a server collaboration policy manager
- a trust and membership directory
- a mail originator
- a payload redirector
- optionally a hub server that offers a central policy-, trust-, and membership directory.

Figure 1:
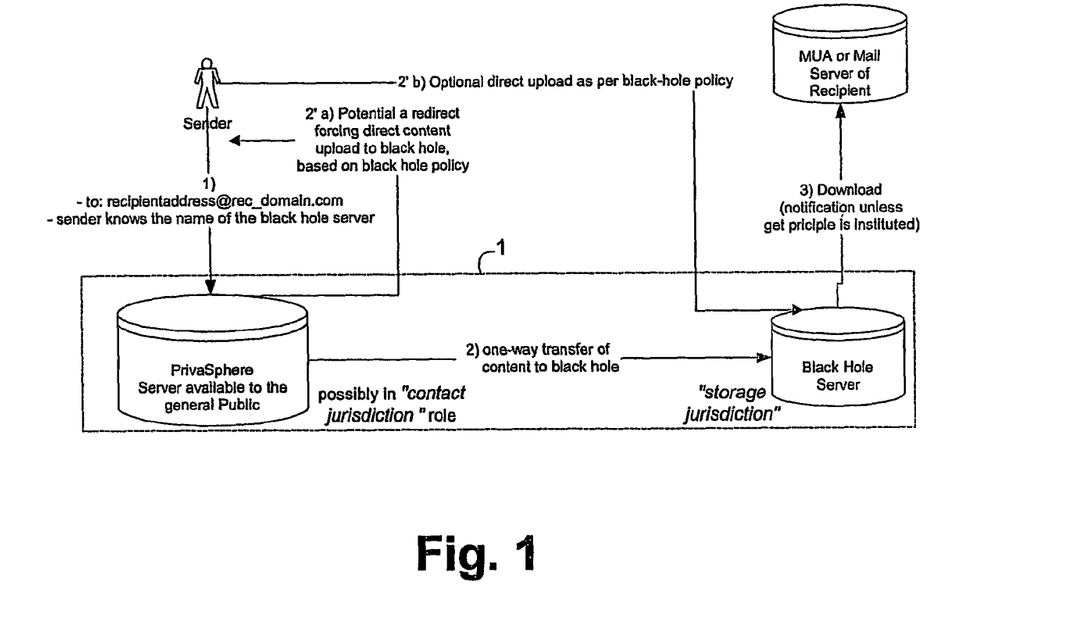
FIG. 1 shows the most restrictive server instance cooperation scenario apart from pure island solutions: a server operation as "complete black hole"
Figure 2:
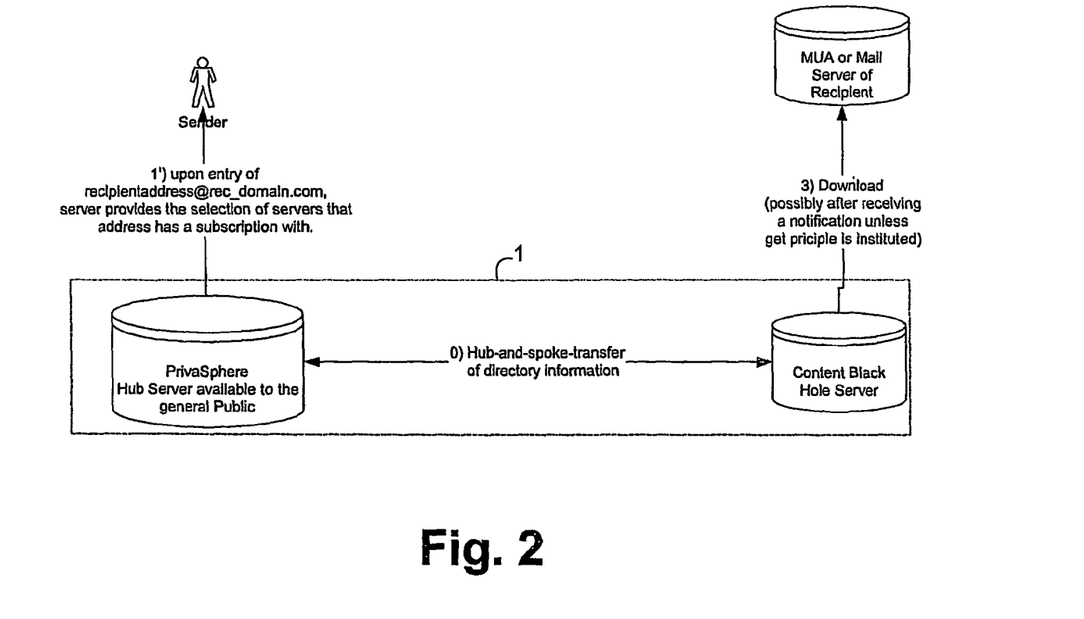
FIG. 2 shows a "content black hole" scenario.
Figure 3:
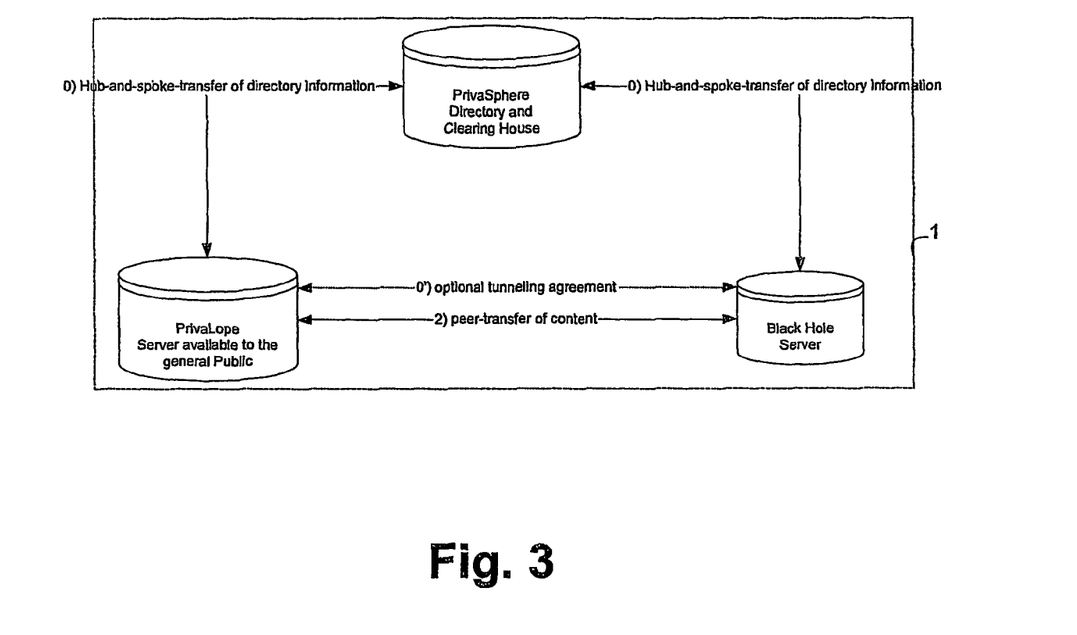
FIG. 3 shows an overall network landscape with a federation of at least approximately equal servers instead of a single hub server.

Key scenarios of interaction among such servers are outlined next and reference is taken to FIGS. 1 to 3:

FIG. 1 shows the most restrictive server instance cooperation scenario apart from pure island solutions: the server operation as "complete black hole". The overall network landscape assumed is that there is a Hub as a default for the public and other service providers that create their own messaging user communities according to specific criteria. Institutions not wanting the outside world to know about their messaging users are likely to run a server according to the definitions of this scenario. This means that the trust and membership directory of the black hole will accept all updates on memberships and trust relationships from other servers, but it will never push such information to others nor respond to corresponding enquiries. Similarly, when another PrivaSphere server receives a message and the sender has indicated that the recipient is a messaging user of the black hole server, the black hole's mail originator will be informed by the sender server's mail originator through the VPN and then notify its recipient itself. The sender will have to enter an address of the kind "recipient@recipDomain.tld@blackhole".

The black hole server, however, will not hand off replies to other servers even if it has the information that the recipients are messaging users to them, but originate all mails itself. Similarly, the black hole's payload redirector may accept uploads of tunneled message content to it from other servers and deliver it to its messaging users, but itself, it will never submit information into such a tunnel without the final recipient having a direct end-to-end "inner tunnel" to the black hole server. Whether a PrivaSphere server assumes this role within a network of servers or whether it assumes any of the roles described next is determined by the domain collaboration policy manager. While the messaging user in principle can determine what his or her contact jurisdiction and storage jurisdiction are, the server collaboration policy manager can override i.e. the institution running the server decides whether running the server under a black hole scenario or with a more open scenario.

Its policies include among others:
i) If the black hole's priority is to avoid connections from non-messaging users, then
  a. the upload will take place to the sender's server or the hub ("hub"),
  b. this hub then relays the message to the black hole server with leaving minimum traces locally, which is shown as per Flow 2 in FIG. 1.
ii) If the black hole rather has the content protected from the hub server's law enforcement, then it instructs the hub server to issue the redirect, as shown per Flow 2a and 2b in FIG. 1.

When the messaging user decides to give up the "nodownload" premise, there is a third option where the sender installs a secure tunneling software. This software then is used to connect the user to the Hub Server, whose payload redirector in turn relays an "inner" secure connection, i.e. between the user and the black hole (storage) server, through a second secure tunnel between the hub and the black hole to the black hole server, as indicated by Flow 0' in FIG. 3. By relaying the secure upload connection, e.g. https from sender to black hole, in this way, two additional service characteristics can be achieved:
1) The content of the message is at most visible to the law enforcement of the black hole server.
2) The relation between the recipient and the black hole is only visible to the law enforcements of the hub and the black hole, but no other eavesdroppers on the communication path thereto.

FIG. 2 shows a "content black hole" scenario. Messages take the same route as before, but user convenience can be improved by the servers being able to offer their sending messaging users the choice of service instances a recipient might be subscribed to. In the case of using the web interface, after entering "recipient@recipdom.tld", the sender will be present the choice of sending to either "recipient@recipdom.tld@contentBlackhole1" or "recipient@recipdom.tld@contentBlackhole2" . . . "recipient@recipdom.tld@contentBlackholeN".

The sender no longer has to know the black-hole server their recipients are messaging users with, but the hub and other servers exchanging directory information by means of their trust and membership directory sub-module (as shown in Flow 0 in FIG. 2) will be able to tell whether and where the recipient is messaging user as shown in Flow 1' of FIG. 2.

Such a "public" messaging user directory record shared needs to contain at least an e-mail address and a server or host ID. The default will also support a distributed version of the trust list management. Therefore, the GMT timestamp of last authenticator reset is included as well and will be broadcasted upon an authenticator reset event. Similarly, if a messaging user is subject to stronger authentication requirements than simple password-login, this will also be part of this trust management attributes to a directory record. E.g. whether client certificates are used or even a challenge-response token with a secure clock (e.g. SecureID). Furthermore, to facilitate end-to-end content super-encryption and provide generic public key directory functions, the servers should also exchange the messaging users' public key(s) provided the owner consents.

If the overall system gets to the level of sophistication where content (storage)—versus traffic-analysis-secrecy (contact) gets traded off, messaging user servers need to convey to the relevant peers only the user preference for traffic analysis protection or content protection. The servers itself specify whether they prefer to be contacted by peers or by redirected uploads in case the users have no corresponding preferences set. This information obviously needs not generally to be shared because each sharing exposes the information to possibly yet another jurisdiction's law enforcement.

PrivaSphere lets the involved parties take yet another service level decision: The messaging users can decide how to handle message status information. It can be both user- and server-determined whether this will be shared after the initial message submission to the black hole. A likely design principle is that each messaging user reads about the status of messages of her or his interest at the own subscription server. A message-storage-location-centered approach is conceivable but poses significant authentication challenges and as per these very scenarios, messages can be stored in multiple locations under very different service levels.

FIG. 3 shows the overall network landscape, when there is no more single "hub" server operator, but possibly a federation of servers equal in most respects. In order to keep the overall system efficient, there will be a central directory service that also maintains the core of the trust-list management function and possibly other services such as financial clearing among service providers.

If the network for private message transferring servers is to scale further, the notion of a "hub-server" will be divided into a directory server and possibly multiple public message holding servers—thus the latter no longer the hub of a hub-and-spoke system. The central policy-, trust-, and membership directory server will continue to be the hub for directory information and is essential to maintaining a distributed trust list that is reliable. It furthermore can handle the clearing/accounting of peer server financial transfers etc. Scalability can further be facilitated if multiple physical servers constituting one messaging user base use geo-proximity redirects to load balance message content and potentially large attachments. Such an architecture adds yet an extra layer of distributed authentication and user management. More variants to this are described in above-mentioned patent application PCT/CH03/00341

The proposed system allows transmitting messages privately and securely with minimum prerequisites for its users. The inventive system allows a secure communication between users without the need for the users to have the same encrypting software (beyond a browser with SSL) or the same security level. Moreover, in a preferred embodiment, the proposed system allows secure transmission of messages between a sender and a recipient, wherein only one of the two parties is subscribed as a messaging user. The system even allows a secure reply by a non-subscribing recipient. It allows secure store & forward replies without having end-to-end message encryption facilities installed on the replier side. Furthermore, the proposed system allows communication between a variety of providers and allows the use of different service levels. In a preferred embodiment, the inventive system allows that messaging users are permanently reachable for secure message content without either having to force the sender nor recipient to download software, exchange public keys and/or reveal their e-mail or name. The inventive system just provides a URL uniquely identifying the recipient to the senders. This also functions as a so called "secure contact me" module. In another preferred embodiment, a public key can be uploaded by messaging users. This public key can be used to facilitate login as client certificate. Then, for example a password reset can be achieved without trust impact because the user's private key remains a trust-maintaining secret that protects the one-time URL in the mail asking for password re-confirmation.

What is claimed is:

1. A computer-based system for securing communication of e-mail messages exchanged between messaging users, the computer-based system comprising:
    a secure messaging server being accessible to the messaging users via a telecommunication network and being designed to store incoming e-mail messages received from the messaging users, the incoming e-mail messages in each case having one of the messaging users specified as a sender (S) of the incoming e-mail message and at least one communication partner specified as a recipient (R) of the incoming e-mail message,
    a database for storing data of the messaging users,
    one or more in- and outgoing automatic message handlers that automatically handle incoming and outgoing e-mail messages according to the data of the messaging users stored in the database,
    a trust management module for managing the messaging users out-of-band verification of their communication partners,
    the trust management module forming in the database associations between the messaging users and their communication partners, the associations being formed by storing in the database the communication partners assigned to the messaging users, and each association being indicative of a trust establishing out-of-band verification of one communication partner of one of the plurality of the messaging users, wherein the trust establishing out-of-band verification takes place via a message unlock code (MUC) which is generated for at least a first communication between the sender (S) and the recipient (R) by the trust management module, and wherein the MUC is transmitted outside the telecommunication network via a different communication device from the sender (S) to the recipient (R),
    in response to detecting a defined trust-destroying action performed by a communication partner after an association indicative of trust is established via a MUC for the communication partner and a message user, the trust management module stores in the database information indicative of a reduced trust level for the communication partner,
    an access control module(s) for granting or denying to a communication partner access to an e-mail message received from one of the messaging users, wherein said granting or denying is based on an association stored in the database which indicates a trust establishing out-of-band verification between said one of the messaging users specified as a sender (S) of the e-mail message and the communication partner specified as a recipient (R) of the e-mail message;
    granting, by the access control module, access to the e-mail message to a recipient of an association that indicates a positive trust establishing out-of-band verification,
    requesting, by the access control module, verification information for a recipient (R) of an association that indicates reduced trust level.

2. System according to claim 1,
    wherein the trust management module transmits securely the message unlock code to the sender (S),
    wherein the access control module(s) is/are designed to control access to the e-mail message based on a comparison of the message unlock code transmitted to the sender (S) and a message unlock code received from the recipient (R), and
    wherein the trust management module is designed to form automatically in the database between the sender (S) and the recipient (R) an association indicative of a trust establishing out-of-band verification of the sender (S) and the recipient (R) dependent on the comparison.

3. System according to claim 1,
    wherein the trust management module is designed to form in the database group
    associations for groups of more than two of the messaging users, a group association being indicative of a trust establishing out-of-band verification of a group of messaging users, and
    wherein the access control module(s) is/are designed to control access to an e-mail message based on the group association between messaging users specified as recipient (R)s of the e-mail message.

4. System according to claim 1,
wherein the trust management module is designed to store in the database a time stamp for every association with a communication partner, and
wherein the trust management module is designed to store in the database information indicative of a reduced trust level for a communication partner in an association having a time stamp older than a defined reset period or a defined point in time.

5. System according to claim 1,
wherein the access control module(s) is/are designed to block communication partners having a reduced trust level access to any e-mail message stored in the system.

6. System according to claim 1,
wherein the access control module(s) is/are designed to provide to a recipient (R) access to a stored e-mail message through a link to the stored e-mail message, the link being protected by a message unlock code to be supplied by a recipient (R) not included in an association indicating a trust establishing out-of-band verification.

7. System according to claim 1,
wherein the system comprises a mass-mail module designed to upload to the system from a respective messaging user an e-mail message to be forwarded as mass-mail and to provide to the respective messaging user a list of message unlock codes for each recipient (R) not included in an association indicating a trust establishing out-of-band verification.

8. System according to claim 1,
wherein the secure messaging server is accessible to the public,
wherein for messaging users being subscribers to the system the database includes subscriber-based instructions,
the instructions comprising information related to one of more than one possible security levels chosen by a subscriber, wherein the system comprises one or more in- and outgoing automatic message handlers that automatically handle in- and outgoing e-mail messages according to the subscriber-based instructions,
wherein the system comprises one or more automatic encrypters that automatically encrypt e-mail messages according to a security level chosen by a recipient (R) or a sender (S) of an e-mail message, a recipient's public key being used for encrypting the e-mail message.

9. System according to claim 1,
wherein the system comprises multiple servers,
wherein the data of the messaging users stored in the database includes jurisdiction data specifying where e-mail messages received from the messaging users are to be stored and to where notifications about the e-mail messages received from the messaging users are to be sent, and wherein the system comprises a service level dimensions module comprising data concerning network-geographic positioning of the multiple servers, and the service level dimensions module enabling the e-mail messages received from the messaging users to be stored in a server as specified in the jurisdiction data and notifications about the e-mail messages received from the messaging users to be sent from a server as specified in the jurisdiction data.

10. Computer-implemented method for securing communication of e-mail messages exchanged between messaging users, the computer-implemented method comprising:
receiving in a secure messaging server incoming e-mail messages from the messaging users via a telecommunication network, the incoming e-mail messages in each case having one of the messaging users specified as a sender(S) of the incoming e-mail message and at least one communication partner specified as a recipient (R) of the incoming e-mail message,
storing the incoming e-mail messages received from the plurality of messaging users, storing data of the messaging users in a database,
managing in the secure messaging server, out-of-band verifications for the messaging users and their communication partners, associations between the messaging users and their communication partners being formed in the database, the associations being formed by storing in the database the communication partners assigned to the messaging users, and each association being indicative of a trust establishing out-of-band verification of one communication partner of one of the messaging users,
wherein the trust establishing out-of-band verification takes place via a message unlock code (MUC) which is generated for at least a first communication between the sender (S) and the recipient (R) by a trust management module, and wherein the MUC is transmitted outside the telecommunication network via a different communication device from the sender (S) to the recipient (R),
in response to detecting a defined trust-destroying action performed by a communication partner after an association indicative of trust is established via a MUC for the communication partner and a message user, the trust management module stores in the database information indicative of a reduced trust level for the communication partner,
granting or denying to a communication partner access to an e-mail message received from one of the messaging users, wherein said granting or denying is based on an association stored in the database which indicates a trust establishing verification between said one of the messaging users specified as a sender (S) of the e-mail message and the at least one communication partner specified as a recipient (R) of the e-mail message;
granting, by an access control module, access to the e-mail message to a recipient of an association that indicates a positive trust establishing out-of-band verification,
requesting, by the access control module, verification information for a recipient (R) of an association that indicates reduced trust level.

\* \* \* \* \*

UNITED STATES PATENT AND TRADEMARK OFFICE
CERTIFICATE OF CORRECTION

PATENT NO. : 8,539,603 B2
APPLICATION NO. : 10/558640
DATED : September 17, 2013
INVENTOR(S) : Hauser It is certified that error appears in the above-identified patent and that said Letters Patent is hereby corrected as shown below:

On the Title Page, item (75), the correct spelling of the inventor's first name is "Ralf.".

In the Claims

The phrase "plurality of" should be removed from claim 10 (column 18, line 17) as requested in the amendment of July 16, 2012. Claim 10 should read:

Computer-implemented method for securing communication of e-mail messages exchanged between messaging users, the computer-implemented method comprising: receiving in a secure messaging server incoming e-mail messages from the messaging users via a telecommunication network, the incoming e-mail messages in each case having one of the messaging users specified as a sender (S) of the incoming e-mail message and at least one communication partner specified as a recipient (R) of the incoming e-mail message, storing the incoming e-mail messages received from the ~~plurality of~~ messaging users, storing data of the messaging users in a database, managing in the secure messaging server, out-of-band verifications for the messaging users and their communication partners, associations between the messaging users and their communication partners being formed in the database, the associations being formed by storing in the database the communication partners assigned to the messaging users, and each association being indicative of a trust establishing out-of-band verification of one communication partner of one of the messaging users, wherein the trust establishing out-of-band verification takes place via a message unlock code (MUC) which is generated for at least a first communication between the sender (S) and the recipient (R) by a trust management module, and wherein the MUC is transmitted outside the telecommunication network via a different communication device from the sender (S) to the recipient (R), in response to detecting a defined trust-destroying action performed by a communication partner after an association indicative of trust is established via a MUC for the communication partner and a message user, the trust management module stores in the database information indicative of a reduced trust level for the communication partner, granting or denying to a communication partner access to an e-mail message received from one of the messaging users, wherein said granting or denying is based on an association stored in the Signed and Sealed this
First Day of July, 2014

Michelle K. Lee
*Deputy Director of the United States Patent and Trademark Office* database which indicates a trust establishing verification between said one of the messaging users specified as a sender (S) of the e-mail message and the at least one communication partner specified as a recipient (R) of the e-mail message; granting, by an access control module, access to the e-mail message to a recipient of an association that indicates a positive trust establishing out-of-band verification, requesting, by the access control module, verification information for a recipient (R) of an association that indicates reduced trust level.